United States Patent
Keck, II

(10) Patent No.: US 11,577,658 B2
(45) Date of Patent: Feb. 14, 2023

(54) CROSSMEMBER ASSEMBLY WITH A SCOTCH YOKE FOR AN ADJUSTABLE ROOF RACK OF A MOTOR VEHICLE

(71) Applicant: PLASMAN US Holdco LLC, Oldcastle (CA)

(72) Inventor: Kenneth E. Keck, II, Clinton Township, MI (US)

(73) Assignee: PLASMAN US Holdco LLC, Oldcastle (CA)

( * ) Notice: Subject to any disclaimer, the term of this patent is extended or adjusted under 35 U.S.C. 154(b) by 0 days.

(21) Appl. No.: 17/526,636

(22) Filed: Nov. 15, 2021

(65) Prior Publication Data
US 2022/0161732 A1 May 26, 2022

Related U.S. Application Data

(63) Continuation-in-part of application No. 17/104,178, filed on Nov. 25, 2020, now Pat. No. 11,299,104, and a continuation-in-part of application No. 17/493,238, filed on Oct. 4, 2021.

(51) Int. Cl.
*B60R 9/045* (2006.01)
(52) U.S. Cl.
CPC .................... *B60R 9/045* (2013.01)
(58) Field of Classification Search
CPC .................. B60R 9/04; B60R 9/045
USPC ....................................................... 224/321
See application file for complete search history.

(56) References Cited

U.S. PATENT DOCUMENTS

| | | | |
|---|---|---|---|
| 2,436,228 A | 2/1948 | Samuel | |
| 2,528,794 A | 11/1950 | Carl | |
| 4,586,638 A * | 5/1986 | Prescott | B60R 9/058 224/322 |
| 4,752,022 A | 6/1988 | Thulin | |
| 5,071,050 A * | 12/1991 | Pudney | B60R 9/045 224/322 |
| 5,377,890 A * | 1/1995 | Brunner | B60R 9/045 224/315 |
| 5,794,826 A * | 8/1998 | Cronce | B60R 9/045 116/282 |

(Continued)

FOREIGN PATENT DOCUMENTS

| | | |
|---|---|---|
| EP | 0894672 B1 | 2/2003 |
| EP | 2426013 B1 | 5/2013 |

(Continued)

*Primary Examiner* — Peter N Helvey
(74) *Attorney, Agent, or Firm* — Vivacqua Crane, PLLC

(57) ABSTRACT

A crossmember assembly is provided for a motor vehicle having a roof with first and second rails. Each rail has a width within a range of widths, with the first and second rails being spaced from one another by distance within a range of distances. The assembly includes a crossbar having first and second ends and movable along the rails. The assembly further includes a first clamp mechanism engaged with the first end for securing the crossbar to the first rail and a second clamp mechanism engaged with the second end for securing the crossbar to the first rail. Each of the first and second clamp mechanisms includes a stanchion attached to the crossbar and having a first rail gripping surface. Each of the first and second clamp mechanisms further includes a scotch yoke, which has a second rail gripping surface and is movable between clamped and unclamped states.

20 Claims, 16 Drawing Sheets

(56) References Cited

U.S. PATENT DOCUMENTS

| | | |
|---|---|---|
| 6,105,841 A | 8/2000 | Aftanas |
| 6,112,965 A | 9/2000 | Lundgren |
| 6,722,541 B1 * | 4/2004 | Aftanas ............... B60R 9/00 224/403 |
| 6,796,471 B2 | 9/2004 | Aftanas et al. |
| 6,959,844 B2 | 11/2005 | Potter et al. |
| 7,066,364 B2 * | 6/2006 | Kmita ............... B60R 9/045 224/325 |
| 7,437,852 B2 | 10/2008 | Dufour et al. |
| 7,458,490 B2 | 12/2008 | Klinkman et al. |
| 7,469,807 B2 | 12/2008 | Jeong |
| 7,721,925 B1 | 5/2010 | Graffy et al. |
| 7,765,738 B2 | 8/2010 | Dufour et al. |
| 7,802,707 B2 | 9/2010 | Aftanas |
| 7,806,306 B2 | 10/2010 | Aftanas |
| 8,056,782 B2 | 11/2011 | Lim et al. |
| 8,087,557 B2 | 1/2012 | Larsson et al. |
| 8,276,794 B2 * | 10/2012 | Aftanas ............... B60R 9/045 224/322 |
| 8,302,828 B2 | 11/2012 | Kim et al. |
| 8,393,507 B2 | 3/2013 | Aftanas |
| 8,640,934 B2 * | 2/2014 | Jamieson ............... B60R 9/058 224/325 |
| 8,839,997 B2 | 9/2014 | Lundgren |
| 9,038,874 B2 | 5/2015 | Poulsen et al. |
| 9,085,266 B2 | 7/2015 | Chang |
| 9,132,782 B2 | 9/2015 | Hubbard |
| 9,194,417 B2 * | 11/2015 | Marchand ............... F16B 31/04 |
| 9,371,041 B2 | 6/2016 | Almhill et al. |
| 9,409,527 B2 | 8/2016 | Hubbard |
| 9,421,918 B2 | 8/2016 | Lundgren |
| 9,566,913 B2 | 2/2017 | Sarges et al. |
| 9,616,819 B2 | 4/2017 | Kmita |
| 9,643,542 B2 | 5/2017 | Aftanas et al. |
| 9,688,211 B2 | 6/2017 | Schierk et al. |
| 9,718,410 B2 | 8/2017 | Cropley et al. |
| 9,725,045 B2 * | 8/2017 | Johansson ............... B60R 9/058 |
| 9,738,229 B2 | 8/2017 | Sato et al. |
| 9,834,152 B2 | 12/2017 | Almhill et al. |
| 10,059,274 B2 | 8/2018 | Kmita |
| 10,279,748 B2 * | 5/2019 | Aftanas ............... B60R 9/04 |
| 10,589,692 B2 * | 3/2020 | Marchlewski ............ E05B 79/08 |
| 10,723,277 B2 * | 7/2020 | Aftanas ............... F16B 2/10 |
| 11,299,104 B1 * | 4/2022 | Syed ............... B60R 9/052 |
| 11,351,928 B2 * | 6/2022 | D'Angelo ............ B25B 23/1427 |
| 2010/0084448 A1 | 4/2010 | Fjelland et al. |
| 2014/0183235 A1 * | 7/2014 | Hubbard ............... B60R 9/058 224/309 |
| 2015/0353023 A1 * | 12/2015 | Schierk ............... B60R 9/058 224/331 |
| 2016/0144795 A1 | 5/2016 | Westberg et al. |
| 2016/0207470 A1 * | 7/2016 | Zander ............... F16B 2/10 |
| 2016/0332581 A1 | 11/2016 | Almhill et al. |
| 2016/0362062 A1 | 12/2016 | Scott et al. |
| 2017/0080872 A1 | 3/2017 | Schactman et al. |
| 2017/0349107 A1 | 12/2017 | Tough |
| 2018/0201200 A1 * | 7/2018 | Wang ............... B60R 9/058 |
| 2022/0219630 A1 * | 7/2022 | Rosas Contreras .. H01R 13/741 |

FOREIGN PATENT DOCUMENTS

| | | |
|---|---|---|
| EP | 2216204 B1 | 11/2013 |
| EP | 1683679 B1 | 7/2015 |
| EP | 2905178 A1 | 8/2015 |
| EP | 2755864 B1 | 7/2016 |
| EP | 2766226 B1 | 8/2016 |
| EP | 3106351 A1 | 12/2016 |
| EP | 2937578 B1 | 2/2017 |
| EP | 3202622 A1 | 8/2017 |
| EP | 2942237 B1 | 10/2017 |
| EP | 3243702 A1 | 11/2017 |

* cited by examiner

CROSSMEMBER ASSEMBLY WITH A SCOTCH YOKE FOR AN ADJUSTABLE ROOF RACK OF A MOTOR VEHICLE

CROSS-REFERENCE TO RELATED APPLICATION

This application is a continuation-in-part of prior U.S. patent application Ser. No. 17/104,178, filed on Nov. 25, 2020, and prior U.S. patent application Ser. No. 17/493,238, filed on Oct. 4, 2021, the entire contents of which are hereby incorporated by reference.

FIELD

The present disclosure relates to roof racks of motor vehicles, and more particularly, to an adjustable roof rack having a pair of rails and one or more crossmember assemblies with clamp mechanisms that utilize a scotch yoke for holding the assemblies in fixed positions on the rails.

BACKGROUND

Modern vehicles have roof racks for increasing the cargo capacity of the vehicles. Non-limiting examples of cargo attached to roof racks can include skis, snowboards, bikes, cargo cages, or cargo containers. The roof rack can include two rails and multiple crossbars extending between the rails at fixed positions along the rails. The width of each rail and the distance between the rails can vary among vehicles of different makes, models, or production years. For that reason, each crossbar can have a fixed length and shape for attachment to only the rails on vehicles of specific makes, models, and production years.

Accordingly, there is a need in the art for a crossmember assembly that allows a crossbar to be attached to rails having one of a range of widths and spaced from one another by one of a range of distances.

SUMMARY

According to several aspects, a crossmember assembly ("assembly") for an adjustable roof rack ("rack") is provided for a motor vehicle having a roof. The rack includes first and second rails attached to the roof. Each of the first and second rails has one of a range of widths, and the first and second rails are spaced from one another by one of a range of distances. The assembly includes a crossbar having first and second ends along an axis. The assembly further includes a first clamp mechanism engaged with the first end of the crossbar for securing the crossbar to the first rail. The assembly further includes a second clamp mechanism engaged with the second end of the crossbar for securing the crossbar to the second rail. Each of the first and second clamp mechanisms includes a stanchion, which is attached to the crossbar and has a first rail gripping surface. Each of the first and second clamp mechanisms further includes a scotch yoke, which is coupled to the stanchion and has a second rail gripping surface. The scotch yoke is movable relative to the stanchion to a clamped state where the first and second rail gripping surfaces of the first and second clamp mechanisms grip an associated one of the first and second rails. The scotch yoke is further movable relative to the stanchion to an unclamped state where the second rail gripping surface of the first and second clamp mechanisms is spaced from an associated one of the first and second rails.

In one aspect, the scotch yoke includes a body mounted to the stanchion. The body is angularly movable relative to the stanchion between first and second rotational positions. The scotch yoke further includes a carrier, which is mounted to the stanchion and includes the second rail gripping surface. The carrier is operatively coupled to the body and movable relative to the stanchion to an inboard position, in response to the body angularly moving to the first rotational position. The carrier is further movable relative to the stanchion to an outboard position, in response to the body angularly moving to the second rotational position. The first and second rail gripping surfaces of the first and second clamp mechanisms grip an associated one of the first and second rails to secure the crossbar in a fixed position on the rails, in response to the carrier moving toward the inboard position.

In another aspect, the second rail gripping surface of the first and second clamp mechanisms is spaced from an associated one of the first and second rails to allow the assembly to move along the first and second rails, in response to the carrier moving toward the outboard position.

In another aspect, one of the body and the carrier defines an elongated slot, and the other of the body and the carrier is rotatably mounted to a post that is in turn received within the elongated slot. The carrier moves between the inboard and outboard positions, in response to the body angularly moving between the first and second rotational positions.

In another aspect, one of the carrier and the stanchion includes one or more elongated pins and the other of the carrier and the stanchion defines one or more bores. The elongated pins are movable through the associated bores, in response to the carrier moving between the inboard and outboard positions.

In another aspect, the assembly further includes a biasing member, which has a first end attached to the carrier and a second end attached to the stanchion, such that the biasing member urges the carrier toward the inboard position.

In another aspect, each of the first and second clamp mechanisms further includes one or more modular pads attached to the stanchion and/or the scotch yoke for gripping an associated one of the first and second rails.

In another aspect, each of the first and second clamp mechanisms further includes a lock mechanism. The lock mechanism is movable to an unlocked state where the carrier is movable between the inboard and outboard positions. The lock mechanism is further movable to a locked state where the lock mechanism holds the carrier in the inboard position or the outboard position.

According to several aspects, an adjustable roof rack ("rack") is provided for a motor vehicle having a roof. The rack includes first and second rails attached to the roof. Each of the first and second rails has one of a range of widths, and the first and second rails are spaced from one another by one of a range of distances. The rack further includes a crossmember assembly ("assembly") having a crossbar with first and second ends along an axis. The assembly further includes a first clamp mechanism engaged with the first end of the crossbar for securing the crossbar to the first rail. The assembly further includes a second clamp mechanism engaged with the second end of the crossbar for securing the crossbar to the second rail. Each of the first and second clamp mechanisms includes a stanchion, which is attached to the crossbar and has a first rail gripping surface. Each of the first and second clamp mechanisms further includes a scotch yoke, which is coupled to the stanchion and has a second rail gripping surface. The scotch yoke is movable relative to the stanchion to a clamped state where the first and second rail gripping surfaces of the first and second clamp mechanisms grip an associated one of the first and second rails. The scotch yoke is further movable relative to the stanchion to an unclamped state, where the second rail gripping surface is spaced from an associated one of the first and second rails. The assembly further includes a cover attached to the stanchion. The scotch yoke is enclosed between the cover and the stanchion when the scotch yoke is moved between the clamped and unclamped states.

In one aspect, each of the first and second rails includes a front end and a rear end. The cover includes a forward surface that faces toward the front end of the first and second rails, a rearward surface that faces toward the rear end of the first and second rails, and an outboard surface that faces away from the crossbar. At least one of the forward surface, the rearward surface, and the outboard surface defines an opening. The opening is adapted to receive a tool for accessing and operating the scotch yoke to facilitate an associated one of the first and second clamp mechanisms with moving between the clamped and unclamped states. The opening is selectively closed by a lid engaged to the cover.

In another aspect, the scotch yoke further includes a shaft rotatably mounted to the stanchion. The shaft has a first end adapted to be engaged by a tool for rotating the shaft and a second end disposed opposite to the first end. The scotch yoke further includes a body attached to the second end of the shaft and angularly movable relative to the stanchion between first and second rotational positions, in response to the tool rotating the shaft. The scotch yoke further includes a carrier mounted to the stanchion. The carrier is operatively coupled to the body and movable relative to the stanchion to an inboard position, in response to the body angularly moving to the first rotational position. The carrier is further movable relative to the stanchion to an outboard position, in response to the body angularly moving to the second rotational position. The carrier includes the second rail gripping surface, such that the first and second rail gripping surfaces of the first and second clamp mechanisms grip an associated one of the first and second rails to secure the crossbar in a fixed position, in response to the carrier moving toward the inboard position.

In another aspect, the second rail gripping surface of the first and second clamp mechanisms is spaced from an associated one of the first and second rails to allow the assembly to move along the first and second rails, in response to the carrier moving toward the outboard position.

In another aspect, one of the body and the carrier defines an elongated slot and the other of the body and the carrier is rotatably mounted to a post that is in turn received within the elongated slot, such that the carrier moves between the inboard and outboard positions, in response to the body angularly moving between the first and second rotational positions.

In another aspect, the scotch yoke further includes a bushing disposed within the elongated slot for engaging the post.

In another aspect, each of the first and second clamp mechanisms further includes a lock mechanism. The lock mechanism is movable to an unlocked state where the carrier is movable between the inboard and outboard positions. The lock mechanism is further movable to a locked state where the lock mechanism holds the carrier in the inboard position or the outboard position.

In another aspect, the lock mechanism includes a gear attached to the shaft and a pawl mounted to the cover. The pawl is movable relative to the scotch yoke to a latched position where the pawl engages the gear for holding the shaft in a fixed position. The pawl is further movable relative to the scotch yoke to an unlatched position where the pawl is spaced from the gear to permit the shaft to rotate. The lock mechanism further includes a spring, which is attached to the cover and urges the pawl to the latched position.

In another aspect, the cover defines an opening positioned adjacent to the pawl or the second end of the shaft. The opening is adapted to receive the tool, such that the tool engages the pawl or the second end of the shaft to facilitate rotation of the shaft when the scotch yoke is enclosed between the cover and the stanchion.

According to several aspects, a process is provided for operating a crossmember assembly ("assembly") of an adjustable roof rack ("rack") of a motor vehicle having a roof. The rack includes first and second rails attached to the roof. Each of the first and second rails has one of a range of widths, and the first and second rails are spaced from one another by one of a range of distances. The assembly includes a crossbar having first and second ends along an axis. The assembly further includes first and second clamp mechanisms engaged with an associated one of the first and second ends of the crossbar. Each of the first and second clamp mechanisms includes a stanchion with a first rail gripping surface, a scotch yoke with a second rail gripping surface, and a cover attached to the stanchion. The process includes moving the scotch yoke relative to the stanchion from a clamped state to an unclamped state when the scotch yoke is enclosed between the stanchion and the cover. The process further includes spacing the second rail gripping surface of the first and second clamp mechanisms from an associated one of the first and second rails, in response to the scotch yoke moving to the unclamped state. The process further includes moving the crossbar from a first position to a second position along the first and second rails. The process further includes moving the scotch yoke relative to the stanchion from the unclamped state to the clamped state, in response to the crossbar moving to the second position, with the scotch yoke being enclosed between the stanchion and the cover. The process further includes gripping, using the first and second rail gripping surfaces of the first and second clamp mechanisms, an associated one the first and second rails to hold the crossbar in the second position, in response to the scotch yoke moving to the clamped state, with the scotch yoke being enclosed between the stanchion and the cover.

In one aspect, the process further includes angularly moving, using a shaft that is coupled to a body of the scotch yoke of each of the first and second clamp mechanisms, the body from a second rotational position to a first rotational position relative to the stanchion. The process further includes moving the carrier to an inboard position relative to the stanchion, in response to the body angularly moving to the first rotational position, with the carrier being enclosed between the stanchion and the cover. The process further includes gripping, using the first and second rail gripping surfaces of the first and second clamp mechanisms, an associated one of the first and second rails, in response to the carrier moving to the inboard position.

In another aspect, the process further includes angularly moving the body of the scotch yoke from the first rotational position to the second rotational position relative to the stanchion. The process further includes moving the carrier to an outboard position relative to the stanchion, in response to the body angularly moving to the second rotational position, with the carrier being enclosed between the stanchion and the cover. The process further includes spacing the second rail gripping surface of each of the first and second clamp mechanisms from an associated one of the first and second rails, in response to the carrier moving to the outboard position.

Further areas of applicability will become apparent from the description provided herein. It should be understood that the description and specific examples are intended for purposes of illustration only and are not intended to limit the scope of the present disclosure.

DETAILED DESCRIPTION

Figure 1:
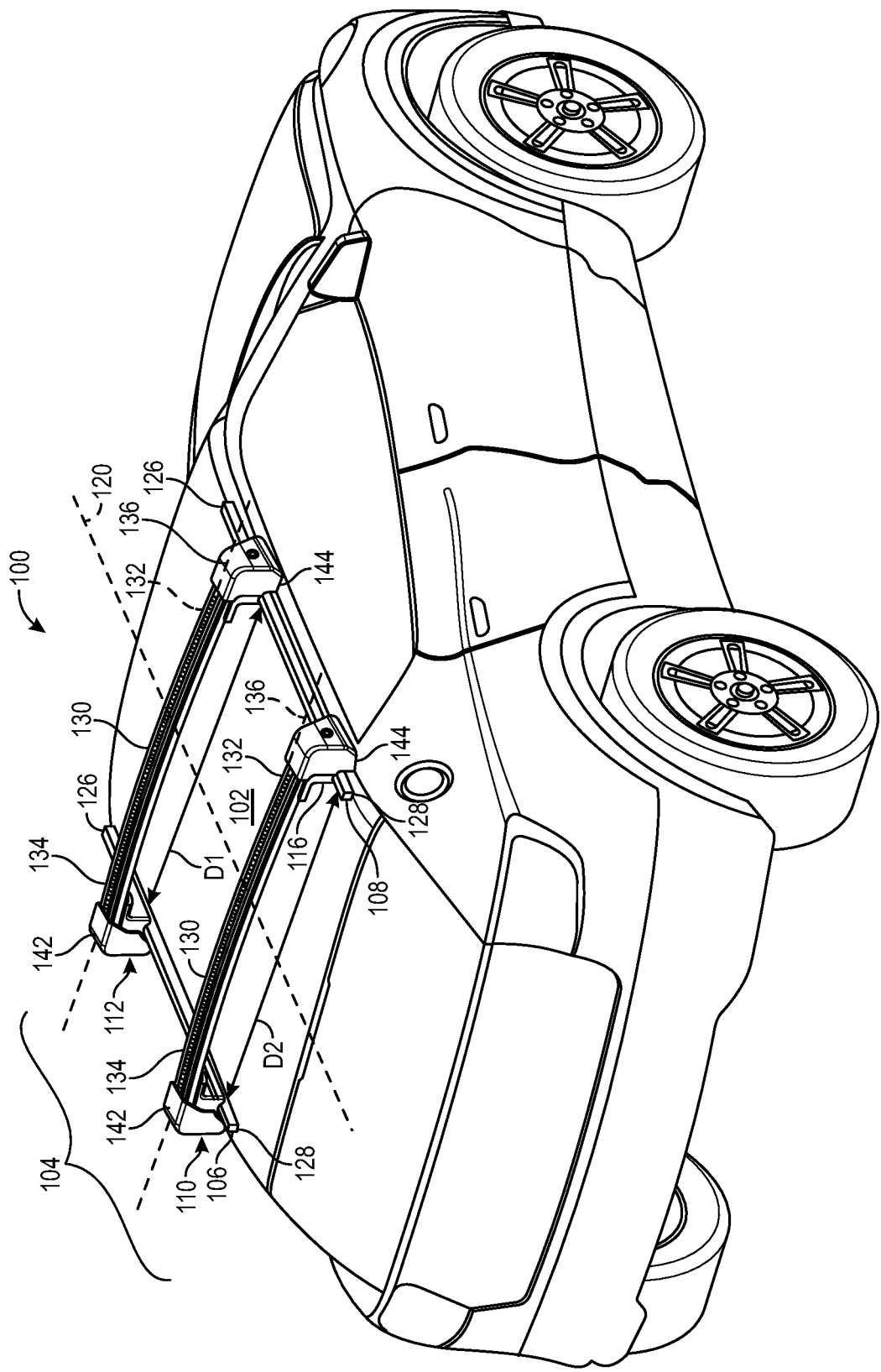
FIG. 1 is a perspective view of one example of a motor vehicle having a roof with an adjustable roof rack including two rails and two crossmember assemblies, illustrating each assembly having first and second clamp mechanisms attaching a crossbar to the rails.
Figure 2:
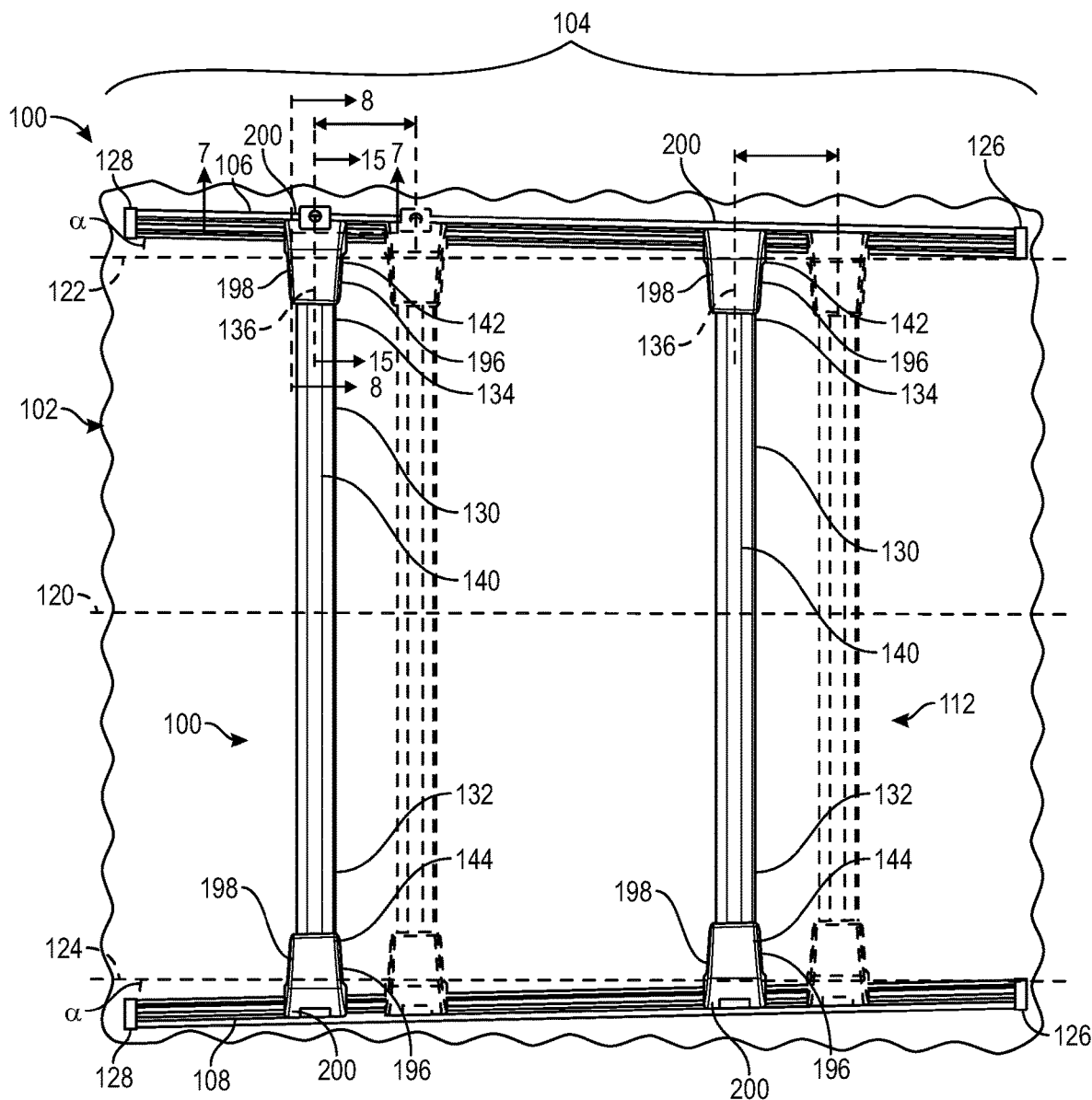
FIG. 2 is a top plan view of the roof of FIG. 1, illustrating each of the crossmember assemblies being movable along the rails.
Figure 5:
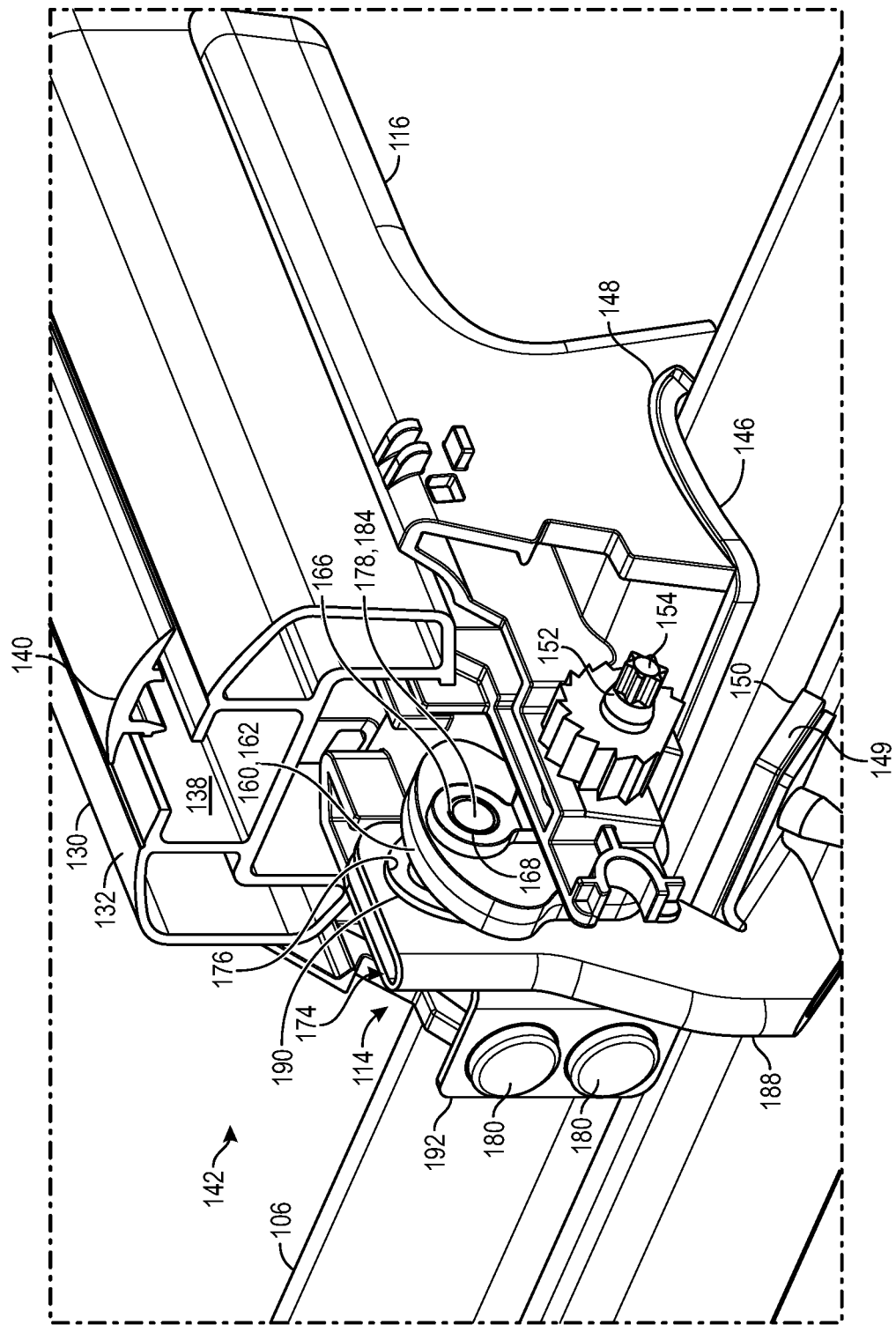
FIG. 5 is an enlarged rear perspective view of the first clamp mechanism of FIG. 4 without the cover and the actuation lever to illustrate the first clamp mechanism having a stanchion and a scotch yoke, which includes a body mounted to the stanchion.
Figure 6:
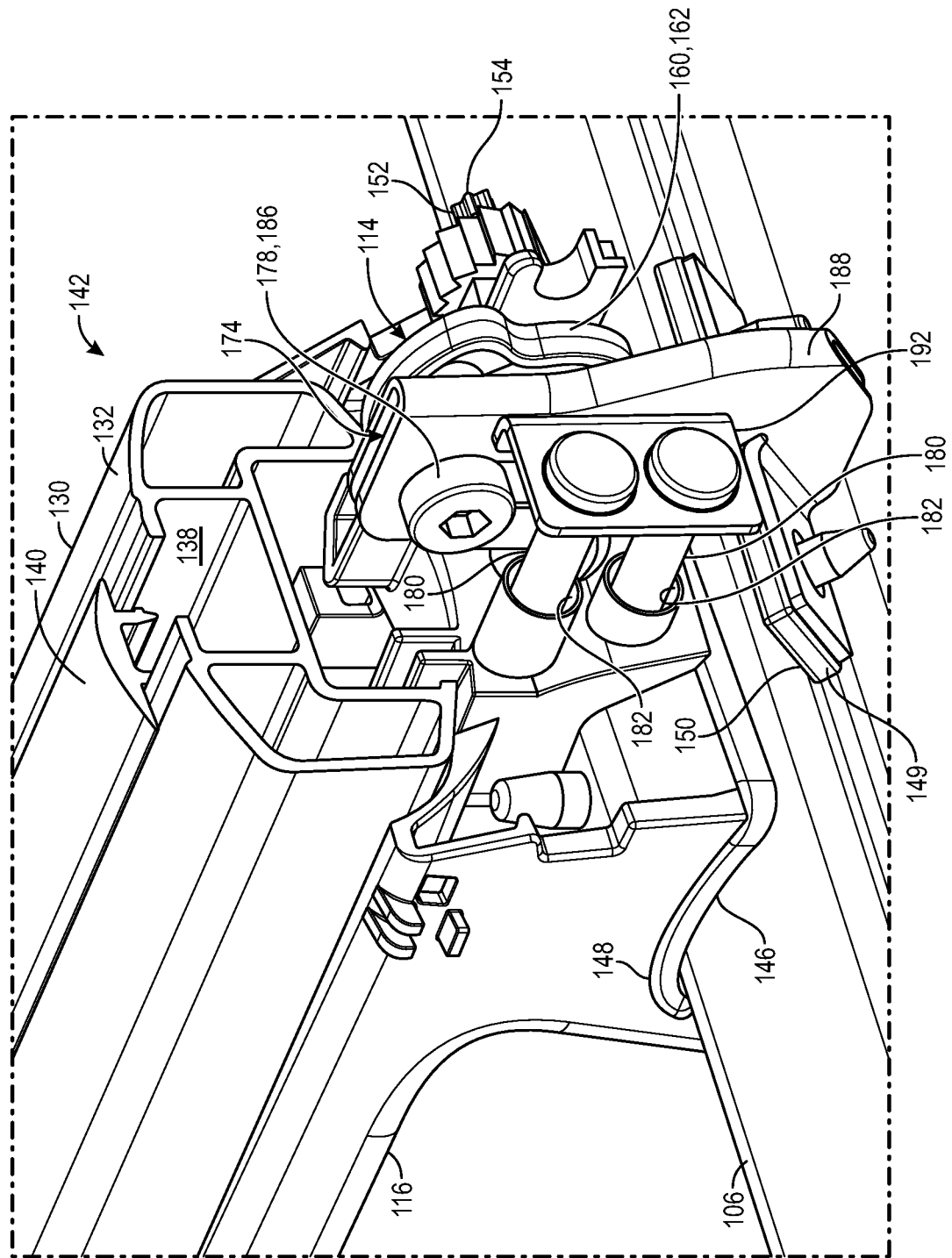
FIG. 6 is an enlarged forward perspective view of the first clamp mechanism of FIG. 5, illustrating the scotch yoke further including a carrier mounted to the stanchion and operably coupled to the body.

The following description is merely exemplary in nature and is not intended to limit the present disclosure, application, or uses. Although the drawings represent examples, the drawings are not necessarily to scale and certain features may be exaggerated to better illustrate and explain a particular aspect of an illustrative example. Any one or more of these aspects can be used alone or in combination within one another. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

Referring to FIGS. 1 and 2, there is generally shown one example of a motor vehicle 100 having a roof 102 with an adjustable roof rack 104 ("rack"). The rack 104 includes first and second rails 106, 108 and two crossmember assemblies 110, 112 ("assemblies") engaging the first and second rails 106, 108. As described in detail below, each assembly 110, 112 has a scotch yoke 114 (FIGS. 5-7) enclosed between a stanchion 116 and a cover 118, and the scotch yoke 114 is actuated via an opening formed in a vertical sidewall of the cover 118 without removing the cover 118 from the stanchion 116. Each assembly 110, 112 has a robust construction that is movable along the rails (FIGS. 2 and 3), is configured to attach to rails that are spaced from one another by a distance within a range of distances, and is configured to grip rails having a width within a range of widths. One non-limiting benefit of the assembly 110, 112 is that it is capable of being integrated within vehicles of different makes, models, and trims. While this non-limiting example of the vehicle 100 includes two assemblies 110, 112 that are identical to one another, it is contemplated that the vehicle 100 can have more or fewer than two assemblies, and those assemblies can be different from one another.

Referring to FIG. 2, each of the first and second rails 106, 108 is disposed about a longitudinal centerline 120 of the vehicle 100. The first and second rails 106, 108 are angularly spaced a predetermined angle α relative to the longitudinal centerline 120 and reference lines 122, 124 parallel to same. As shown in FIG. 1, front ends 126 of the first and second rails 106, 108 are spaced from one another by a front end distance D1. Rear ends 128 of the first and second rails 106, 108 are spaced from one another by a rear end distance D2, which is shorter than the front end distance D1. It is contemplated that the rear ends of the rails can be spaced from one another by a distance, which is longer than the distance by which the front ends are spaced from one another. In still other non-limiting examples, the rails can be linear or arranged parallel with one another.

Figure 3:
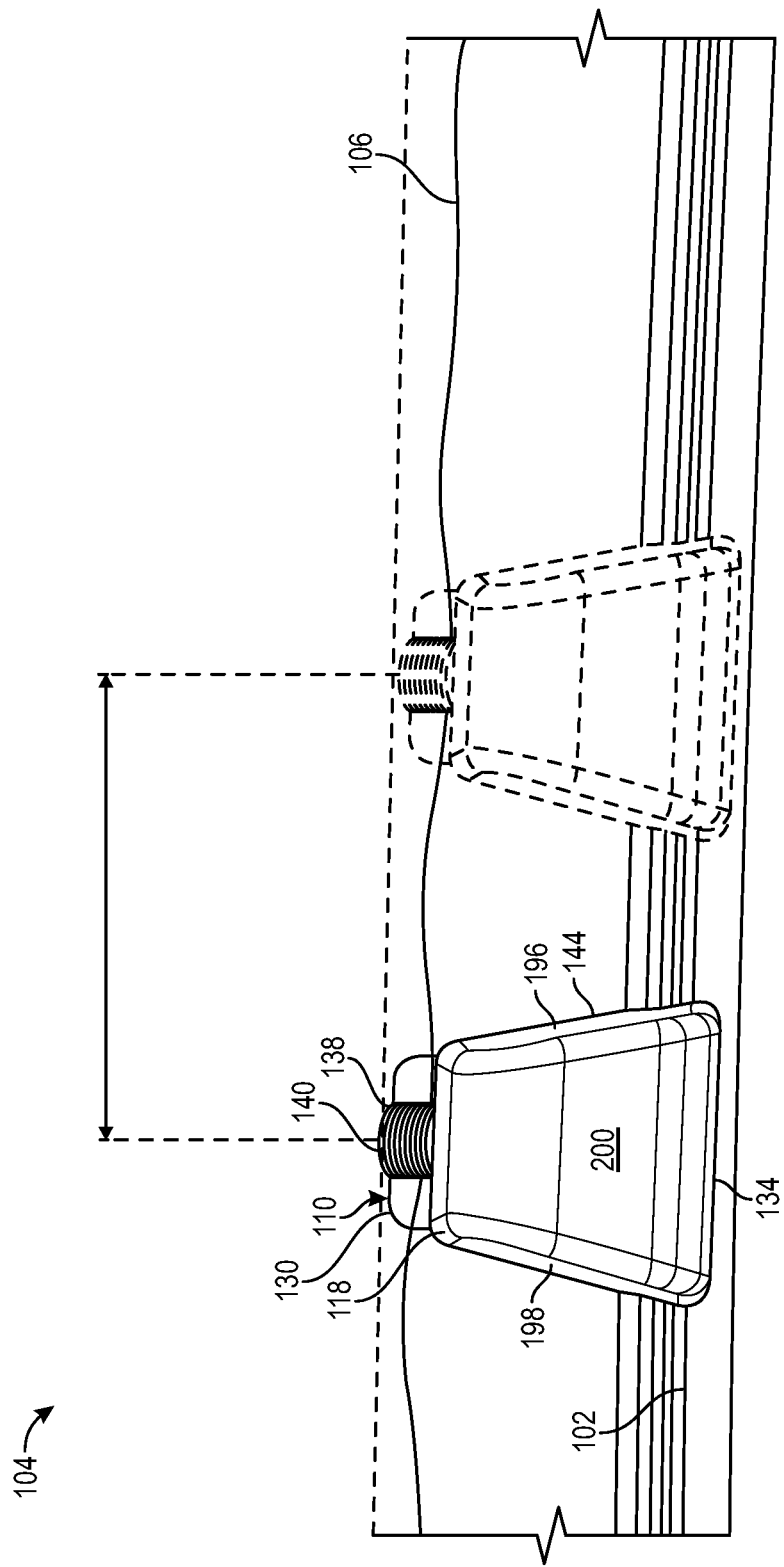
FIG. 3 is an end view of one of the cross member assemblies of FIG. 2, illustrating a side profile of the roof and one of the rails having a curving slope.
Figure 4:
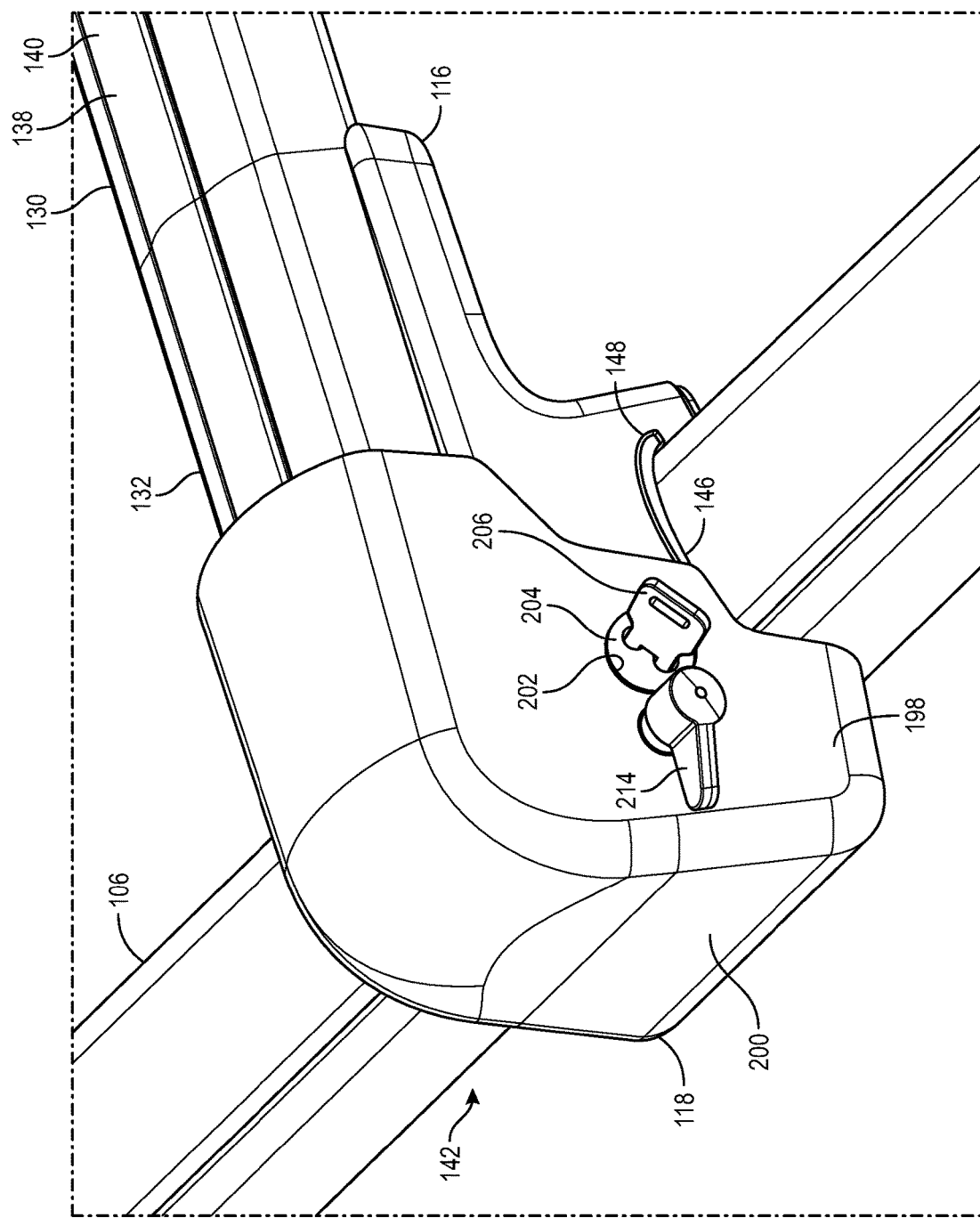
FIG. 4 is an enlarged rear perspective view of the first clamp mechanism of FIG. 1, illustrating the first clamp mechanism having a cover with a vertical sidewall, which defines an opening selectively closed by a lid and includes an actuation lever for operating the first clamp mechanism.

Referring to FIG. 3, the exemplary rails 106, 108 can follow the roof 102 and have a profile that curves vertically toward the front of the vehicle, such that positioning the assembly 110 toward the front ends 126 of the rails 106, 108 can dispose the assembly 110 at a position that is vertically above or below the other assembly 110. However, it is contemplated that the rails can be linear or have any suitable cross-sectional profiles.

Referring back to FIGS. 1 and 2, each assembly 110, 112 includes a crossbar 130 having first and second ends 132, 134 along an axis 136. The exemplary crossbar 130 is an extrusion that defines an open channel 138 (FIGS. 5 and 6) for receiving a trim insert 140. Each assembly 110 further includes a first clamp mechanism 142 attached to the first end 132 of the crossbar 130 for securing the first end 132 to the first rail 106 and a second clamp mechanism 144 attached to the second end 134 of the crossbar 130 for securing the second end 134 to the second rail 108. While FIGS. 3-12 illustrate multiple views of only the first clamp mechanism 142 as described in detail below, the second clamp mechanism 144 and the second end 134 of the crossbar 130 are identical to the first clamp mechanism 142 and the first end 132 of the crossbar 130. In other non-limiting examples, the second clamp mechanism and second end of the crossbar can be different from the first clamp mechanism and first end of the crossbar.

Referring to FIGS. 5-8, the first clamp mechanism 142 includes a stanchion 116 attached to the crossbar 130 and having a first rail gripping surface 146. In this non-limiting example, the first clamp mechanism 142 further includes one or more modular pads adapted to grip the rail, with the rail having a predetermined cross-sectional profile. More specifically, the first clamp mechanism 142 further includes a first modular pad 148 that is attached to the stanchion 116 and includes the first rail gripping surface 146 for gripping an inboard side of the first rail 106. As described in further detail below, the first clamp mechanism 142 further includes a second modular pad 149 that includes the second rail gripping surface 150 for gripping an outboard side of the first rail 106. Each modular pad has a thickness within a range of thicknesses, a profile within a range of profiles, a width within a range of widths, and a shape within a range of shapes, such that the modular pads can cooperate with the scotch yoke 114 and the stanchion 116 for gripping the first rail 106. One non-limiting example of a benefit associated with the modular pad is that the modular pads may permit the assembly to be installed on one of a range of makes, models, and trims of vehicles. In addition, it is contemplated that the tolerances of the rack can be satisfied to minimize noise and vibration. In other non-limiting examples, it is contemplated that the assembly may have two or more modular pads attached to any portion of the assembly or not have any modular pads.

The first clamp mechanism 142 further includes the scotch yoke 114 attached to the stanchion 116, with the scotch yoke 114 having the second rail gripping surface 150. The scotch yoke 114 is movable relative to the stanchion 116 to a clamped state (FIG. 8) where the first and second rail gripping surfaces 146, 150 of the first and second clamp mechanisms 142, 144 grip an associated one of the first and second rails 106, 108. The scotch yoke 114 is further movable relative to the stanchion 116 to an unclamped state (FIG. 9) where the second rail gripping surface 150 is spaced from an associated one of the first and second rails 106, 108.

Figure 7:
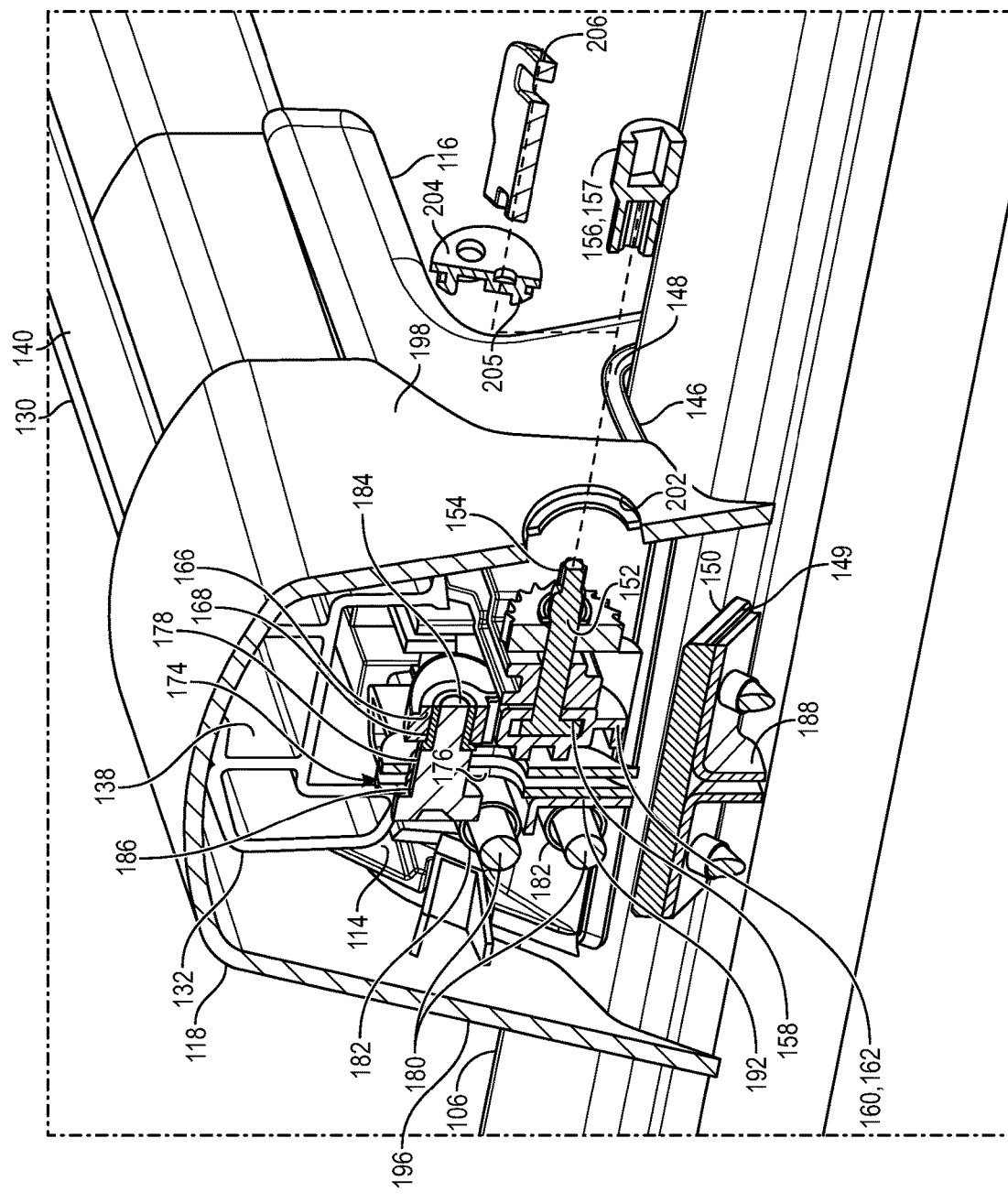
FIG. 7 is a cross-sectional view of the first clamp mechanism of FIG. 2 as taken along line 7-7, illustrating the body rotatably mounted to the stanchion via a shaft and the carrier operably coupled to the body by a post.
Figure 9:
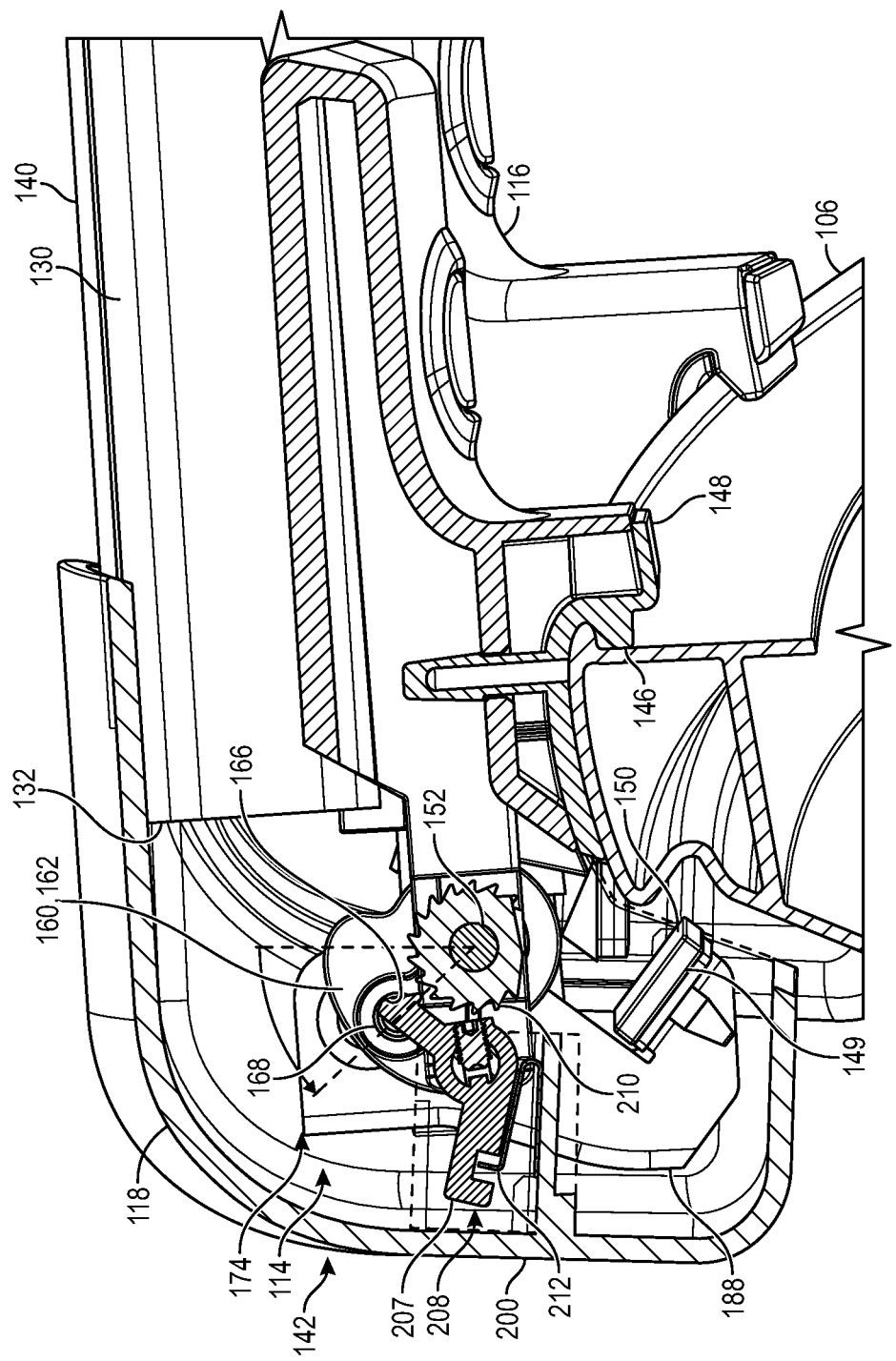
FIG. 9 is a cross-sectional view of the first clamp mechanism of FIG. 8, illustrating the scotch yoke being moved from the to an unclamped state when the scotch yoke is enclosed between the cover and the stanchion.
Figure 10:
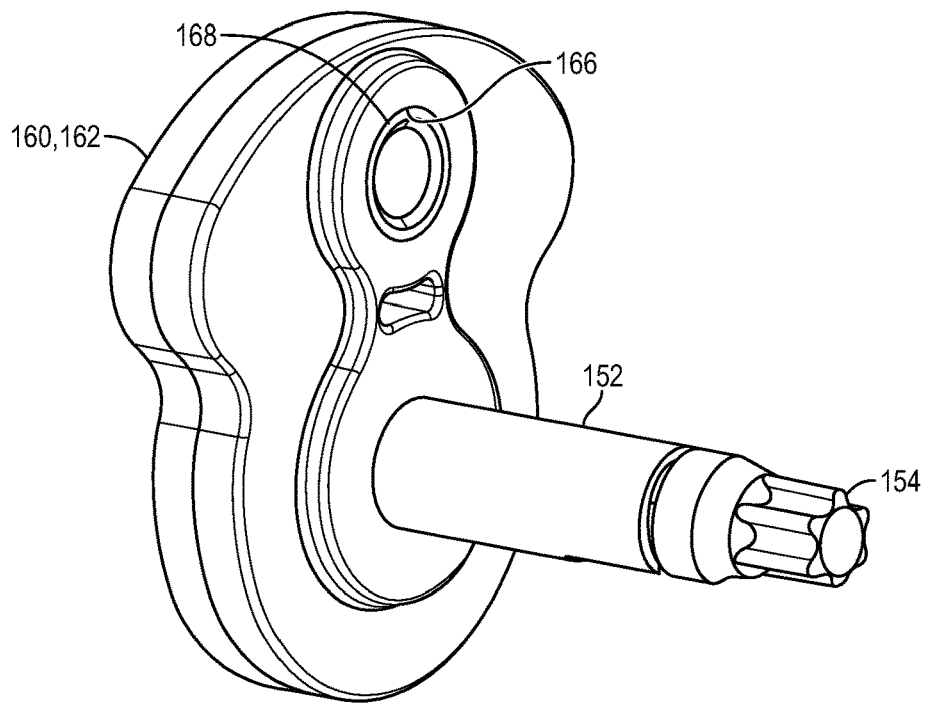
FIG. 10 is a perspective view of the body of the scotch yoke of FIG. 5, illustrating the body coupled to a shaft for rotatably mounting the body to the stanchion and defining a hole with a bushing for rotatably mounting to a post that is in turn coupled to the carrier.
Figure 11:
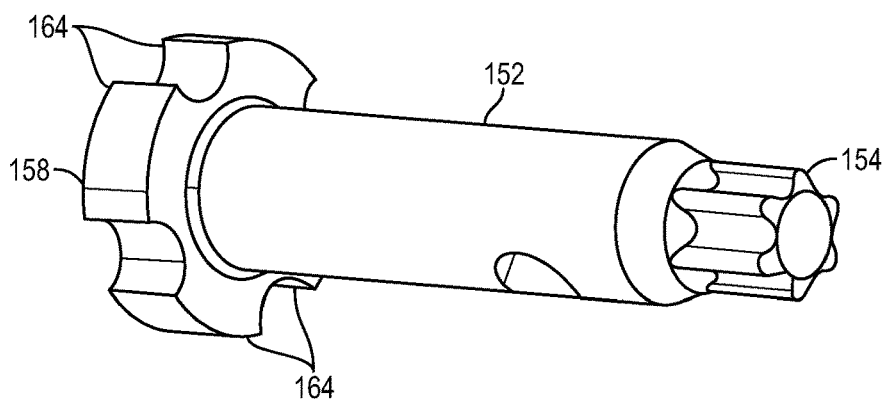
FIG. 11 is a perspective view of the shaft of FIG. 10.
Figure 12:
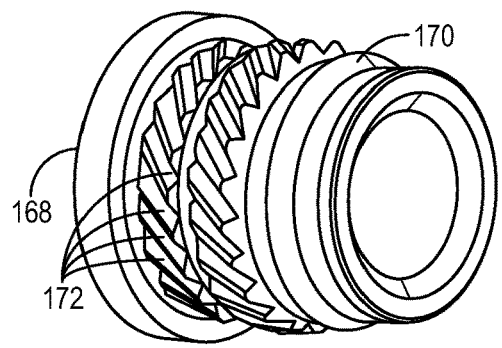
FIG. 12 is a perspective view of the bushing of FIG. 10.

As best shown in FIG. 7, the scotch yoke 114 includes a shaft 152 rotatably attached to the stanchion 116. The shaft 152 includes a first end 154 adapted to be engaged by a tool 156 for rotating the shaft 152 and a second end 158 disposed opposite to the first end 154. The scotch yoke 114 further includes a body 160 attached to the second end 158 of the shaft 152. The body 160 is angularly movable relative to the stanchion 116 between first and second rotational positions relative to the stanchion 116 (FIGS. 8 and 9), in response to the tool 156 rotating the shaft 152 in associated clockwise and counterclockwise directions. As shown in FIG. 10, the body 160 is a cam 162 with the second end 158 (FIGS. 7 and 11) of the shaft 152 insert molded therein. The second end 158 includes a plurality of tabs 164 (FIG. 11) angularly spaced from one another and embedded within the cam 162 to prevent the shaft 152 from rotating relative to the cam 162. In other non-limiting examples, the body and/or the shaft can be made of any suitable material and attached to one another by any suitable fastening method. The cam 162 further defines a hole 166 spaced from the shaft 152 with a bushing 168 received within the hole 166. In one non-limiting example, the bushing 168 is insert molded within the body 160 and has an annular surface 170 (FIG. 12) with a plurality of ridges 172 adapted to be embedded within the body 160 to prevent the bushing 168 and the body 160 from rotating relative to one another. It is contemplated that the bushing can be attached to the body by any suitable fastening method.

Figure 8:
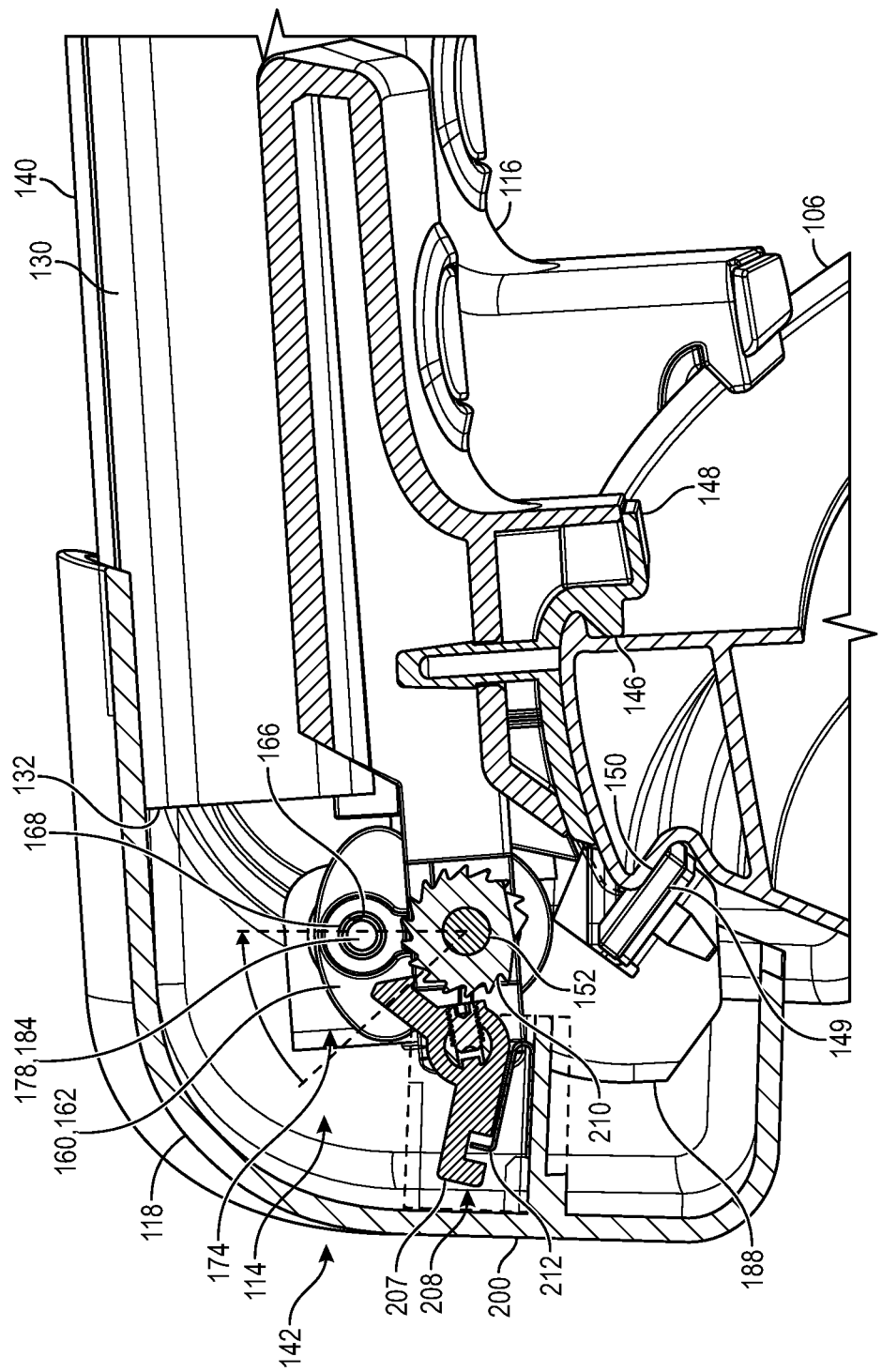
FIG. 8 is a cross-sectional view of the first clamp mechanism of FIG. 2 as taken along line 8-8, illustrating the first clamp mechanism having a lock mechanism moved to an unlocked state, with the scotch yoke being moved to a clamped state when the scotch yoke is enclosed between the cover and the stanchion.

Referring back to FIGS. 6, 8, and 9, the scotch yoke 114 further includes a carrier 174 mounted to the stanchion 116. The carrier 174 is movable relative to the stanchion 116 to an inboard position (FIG. 8), in response to the body 160 angularly moving to the first rotational position. The carrier 174 is further movable relative to the stanchion 116 to an outboard position (FIG. 9), in response to the body 160 angularly moving to the second rotational position. The carrier 174 includes the second rail gripping surface 150, and the first and second rail gripping surfaces 146, 150 of the first clamp mechanism 142 grip the first rail 106 to secure the crossbar 130 in a fixed position, in response to the carrier 174 moving toward the inboard position (FIG. 8). The second rail gripping surface 150 is spaced from the first rail 106 to allow the crossmember assembly 110 to move along the first rail 106 in response to the carrier 174 moving toward the outboard position (FIG. 9).

One of the body 160 and the carrier 174 defines an elongated slot 176, and the other of the body 160 and the carrier 174 is rotatably mounted to a post 178 that is in turn received within the elongated slot 176. The carrier 174 moves between the inboard and outboard positions, in response to the body 160 angularly moving between the first and second rotational positions. More specifically, in the non-limiting example, the scotch yoke 114 includes the post 178 (FIG. 7) having a first end 184 received in the hole 166 of the cam 162 and a second end 186 opposite to the first end 184. The carrier 174 (FIGS. 7, 13, and 14) includes a first bracket 188 defining an elongated slot 176 that receives the second end 186 of the post 178, such that the carrier 174 moves between the inboard and outboard positions, in response to the body 160 angularly moving between the first and second rotational positions. The first bracket 188 further includes the second modular pad 149 with the second rail gripping surface 150. The scotch yoke 114 further includes a bushing 190 disposed within the elongated slot 176 of the first bracket 188 for engaging the second end 186 of the post 178 to prevent the post 178 and the first bracket 188 from binding together. In addition, the carrier 174 further includes a second bracket 192 (FIGS. 13 and 14) attached to the first bracket, e.g. by spot welding, and the second modular pad 149 is attached to the second bracket 192. In other non-limiting examples, it is contemplated that the body can define the elongated slot with the bushing, and the carrier can be rotatably mounted to the post that is in turn received within the elongated slot. It is contemplated that the carrier can include any number of components, e.g., a single-piece bracket made by three-dimensional printing and coupled to the post, the pins, and the pad.

One of the carrier 174 and the stanchion 116 includes one or more elongated pins 180, and the other of the carrier 174 and the stanchion 116 defines one or more associated bores 182, with the elongated pins 180 being movable through the bores 182, in response the carrier 174 moving between the inboard and outboard positions. Continuing with the previous example, the carrier 174 further includes two elongated pins 180 (FIGS. 7 and 13-15) attached to the second bracket 192, e.g., by spin welding. The elongated pins 180 are received within and movable through two associated bores 182 formed in the stanchion 116, such that the carrier is movable between the inboard position and the outboard position. In still other non-limiting examples, it is contemplated that the stanchion includes more or fewer than two elongated pins, and the carrier defines more or fewer than two bores.

Figure 13:
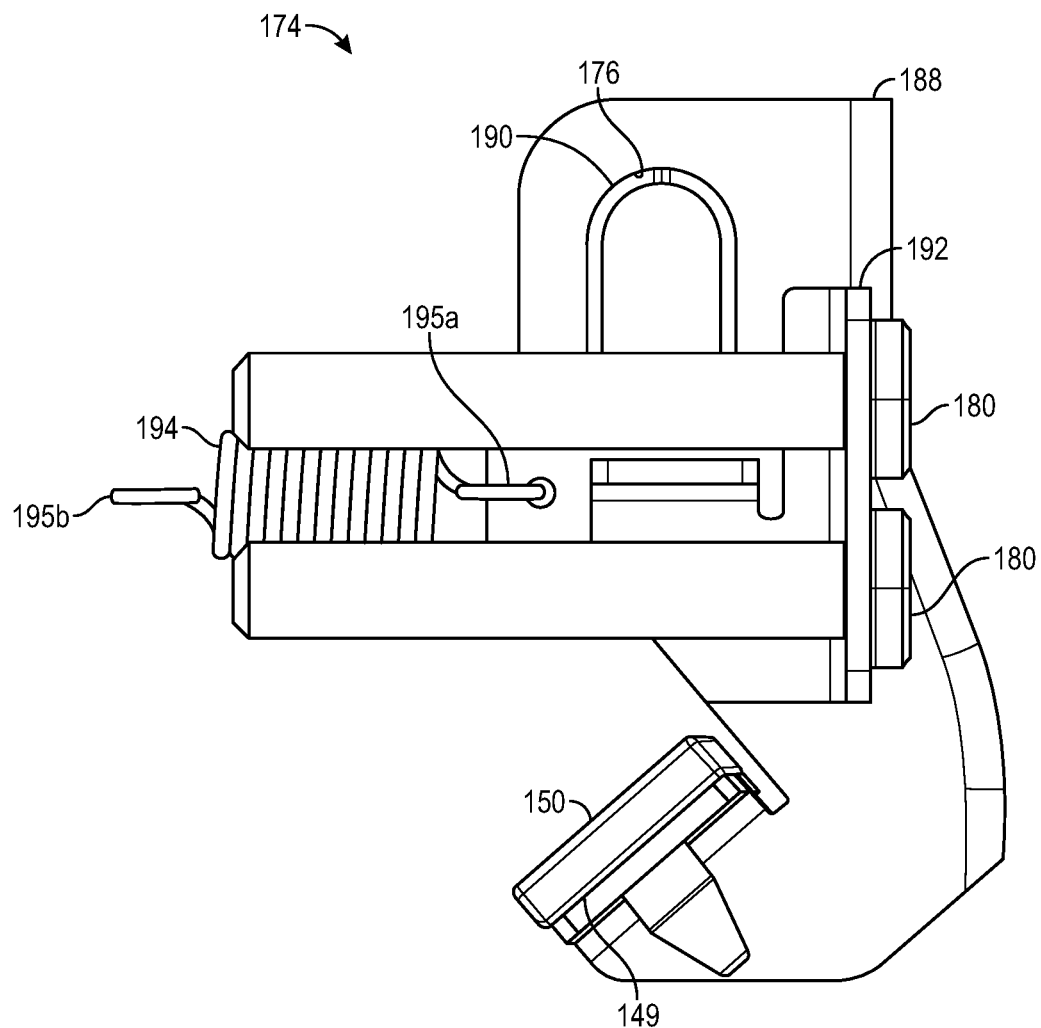
FIG. 13 is a front plan view of the carrier of the scotch yoke of FIG. 6.
Figure 14:
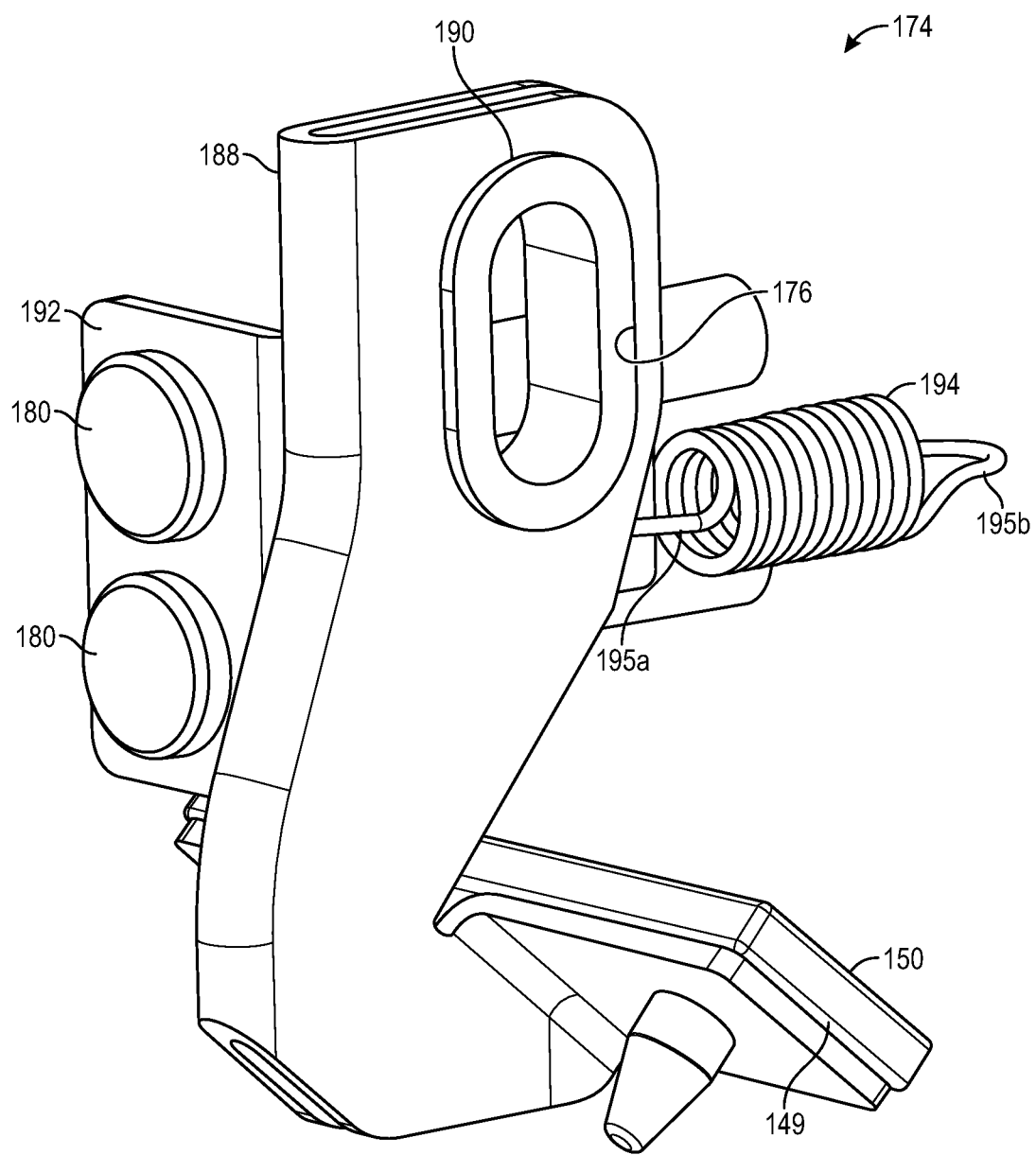
FIG. 14 is a rear perspective view of the carrier of FIG. 13.
Figure 15:
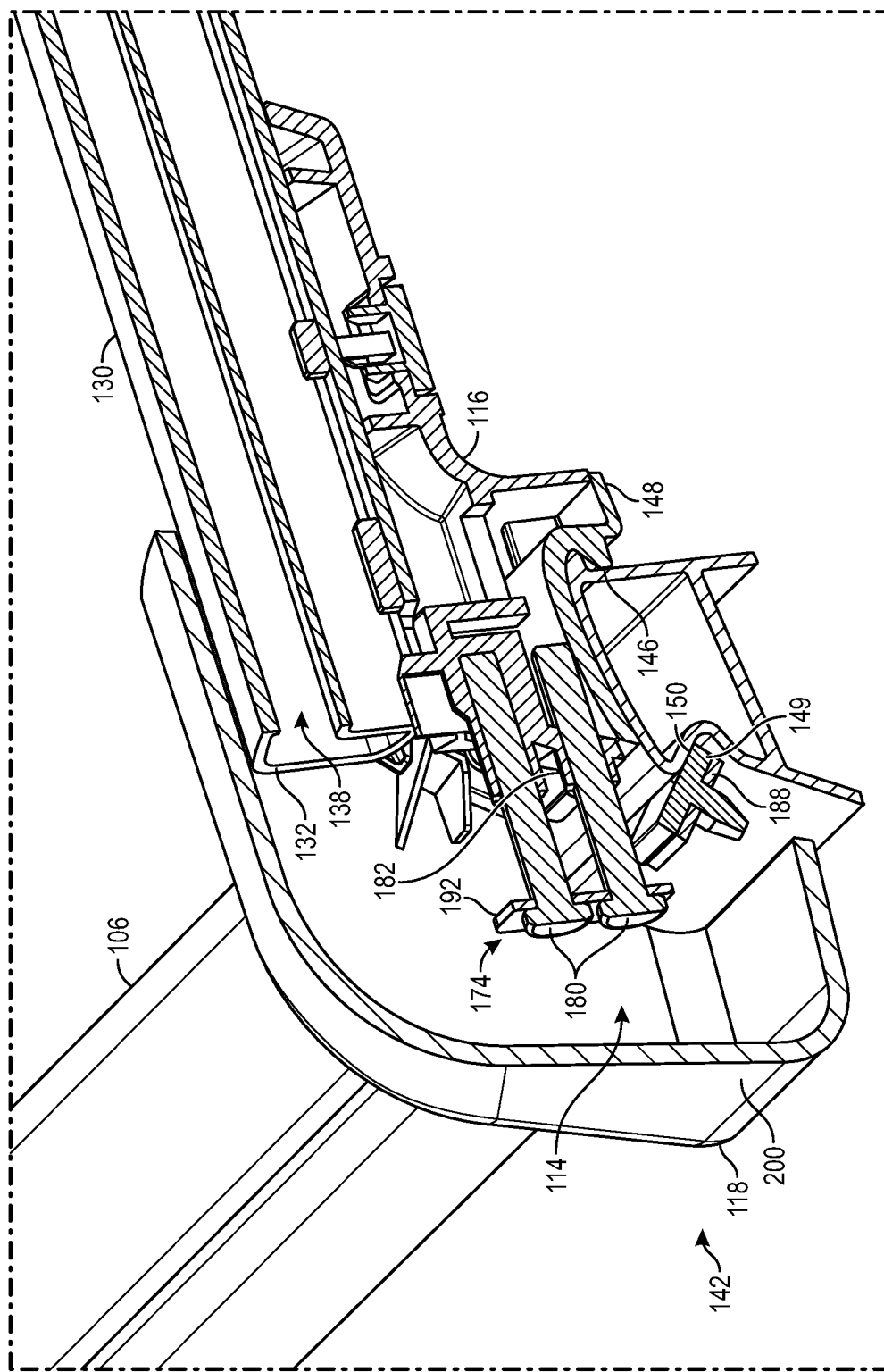
FIG. 15 is a cross-sectional view of the first clamp mechanism of FIG. 2 as taken along line 15-15, illustrating the carrier linearly movable relative to the stanchion via two elongated pins.

As shown in FIGS. 13 and 14, the scotch yoke 114 further includes a biasing member 194 having a first end 195a attached to the carrier 174 and a second end 195b attached to the stanchion 116, such that the biasing member 194 urges the carrier 174 toward the inboard position where the first clamp mechanism 142 secures the crossbar 130 to the first rail 106. In this non-limiting example, the biasing member 194 is a helical spring. However, it is contemplated that the biasing member can be other suitable springs or urging mechanisms.

Referring back to FIGS. 8 and 9, the first clamp mechanism 142 further includes the cover 118 attached to the stanchion 116, with the scotch yoke 114 being enclosed between the cover 118 and the stanchion 116 when the scotch yoke 114 moves between the clamped and unclamped states. As best shown in FIG. 2, the cover 118 includes a forward surface 196 that faces toward the front end 126 of the first rail 106, a rearward surface 198 that faces toward the rear end 128 of the first rail 106, and an outboard surface 200 that faces away from the crossbar 130. At least one of the forward surface 196, the rearward surface 198, and the outboard surface 200 defines an opening 202 (FIGS. 4 and 7), with the opening 202 adapted to receive the tool 156 (FIG. 7) for accessing and operating the scotch yoke 114 and facilitating the first clamp mechanism 142 with moving between the clamped and unclamped states. The opening 202 is selectively closed by a lid 204 (FIGS. 4 and 7) that is engaged to the cover 118 by, for example, a cam-lock fastener 205 (FIG. 7). The lid 204 can be rotated by a key 206 and removed from the cover 118. The opening 202 is positioned adjacent to the second end 158 of the shaft 152 or a pawl 207 of a lock mechanism 208 as described below, with the opening 202 adapted to receive the tool 156 such that the tool 156 engages the pawl 207 or the second end 158 of the shaft 152 to facilitate rotation of the shaft 152 while the scotch yoke 114 remains enclosed between the cover 118 and the stanchion 116. In this non-limiting example, the opening 202 is disposed adjacent to the second end 158 of the shaft, which has a star-shaped cross-sectional profile, such that a socket 157 with an associated star-shaped cross-sectional profile can be inserted through the opening 202 to engage the second end 158 of the shaft 152 and transmit torque to the shaft 152 for rotating the body 160. In other non-limiting examples, the opening can be disposed adjacent to the lock mechanism 208 as described below for moving the lock mechanism 208 between the unlocked and locked states.

Figure 16:
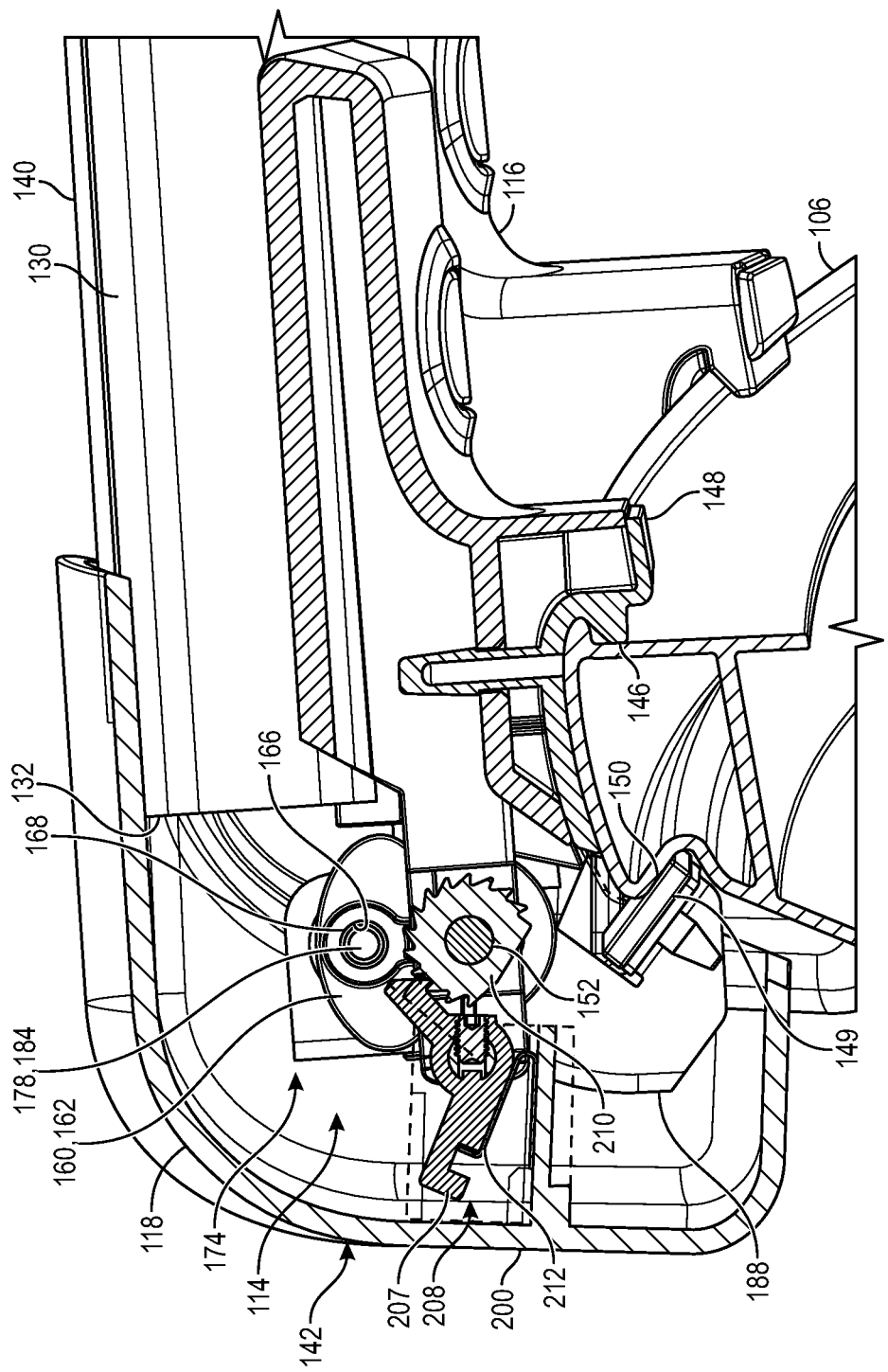
FIG. 16 is a cross-sectional view of the first clamp mechanism of FIG. 8, illustrating the lock mechanism moved from the unlocked state to a locked state to hold the scotch yoke in the clamped state.
Figure 17:
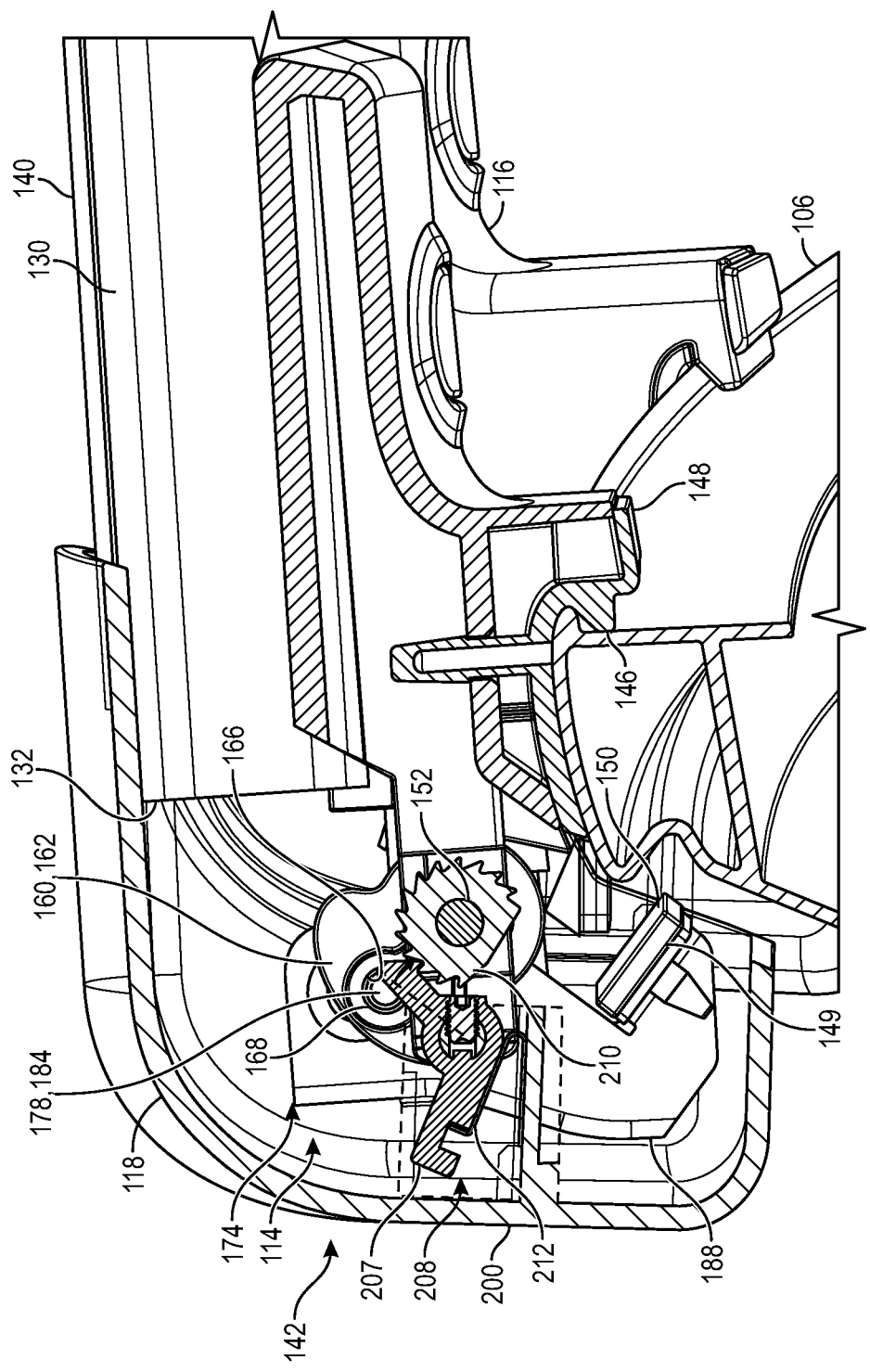
FIG. 17 is a cross-sectional view of the first clamp mechanism of FIG. 9, illustrating the lock mechanism moved from the unlocked state to the locked state to hold the scotch yoke in the unclamped state.

The first clamp mechanism 142 further includes a lock mechanism 208, with the lock mechanism 208 movable to an unlocked state (FIGS. 8 and 9) where the carrier 174 is movable between the inboard and outboard positions. The lock mechanism 208 is further movable to a locked state (FIGS. 16 and 17) where the lock mechanism 208 holds the carrier 174 in the inboard position or the outboard position. The lock mechanism 208 includes a gear 210 attached to the shaft 152 and the pawl 207 mounted to the cover 118, with the pawl 207 movable relative to the scotch yoke 114 between a latched position (FIGS. 16 and 17) where the pawl 207 engages the gear 210 for holding the shaft 152 in a fixed position and an unlatched position (FIGS. 8 and 9) where the pawl 207 is spaced from the gear 210 to permit the shaft 152 to rotate. The lock mechanism 208 further includes a spring 212, e.g. a leaf spring, attached to the cover 118 and urging the pawl 207 to the latched position. The first clamp mechanism 142 further includes an actuator 214 (FIG. 4) for moving the lock mechanism 208 between the unlocked and locked states. In this non-limiting example, the actuator 214 is a lever or handle that is releasably attached to the pawl 207, such that the handle can be detached and removed from the pawl 207 when: the assembly has been moved to the desired position; the scotch yoke 114 has been moved to the clamped state; and the pawl 207 has been moved to the latched state. In other non-limiting examples, the handle can be fixedly attached to the pawl. In still other examples, the actuator can be a motor that moves the pawl between latched and unlatched positions and/or moves the assembly along the rails.

Figure 18:
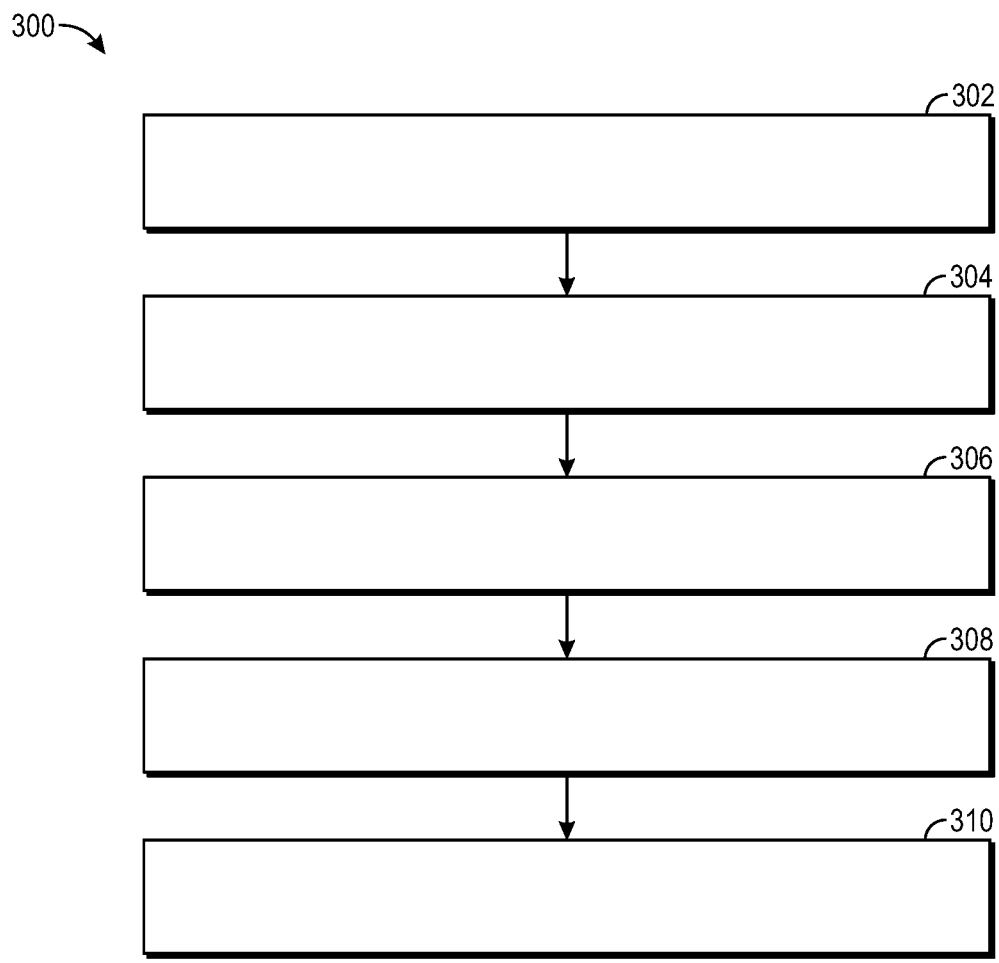
FIG. 18 is a flow chart of one example of a process for operating the adjustable roof rack.

Referring now to FIG. 18, a process 300 is provided for operating the rack 104 of FIG. 1. The process 300 begins at block 302 with the scotch yoke 114 moving relative to the stanchion 116 from a clamped state to an unclamped state, with the scotch yoke 114 being enclosed between the stanchion 116 and the cover 118. More specifically, in this non-limiting example, the user operates the handle to move the lock mechanism 208 from the locked state to the unlocked state. The key 206 is engaged to the lid 204 to rotate the lid 204 and remove the lid 204 from the cover 118. The tool 156 is inserted through the opening 202 and engaged with the first end 154 of the shaft 152 to rotate the shaft 152. The body 160 of the scotch yoke 114 of each of the first and second clamp mechanisms 142, 144 is angularly moved relative to the stanchion 116 from the first rotational position to the second rotational position, in response to the tool 156 rotating the shaft 152 in one of a clockwise direction and a counterclockwise direction. The carrier 174 moves to the outboard position, in response to the body 160 angularly moving to the second rotational position, with the carrier 174 being enclosed between the stanchion 116 and the cover 118.

At block 304, the second rail gripping surface 150 of the first and second clamp mechanisms 142, 144 is spaced from an associated one of the first and second rails 106, 108, in response to the scotch yoke 114 moving to the unclamped state. More specifically, continuing with the previous non-limiting example, the second rail gripping surface 150 of each of the first and second clamp mechanisms 142, 144 is spaced from an associated one of the first and second rails 106, 108, in response to the carrier 174 moving to the outboard position.

At block 306, the user moves the crossbar 130 from the first position to the second position along the first and second rails 106, 108 where, for example, the crossbar 130 is positioned to support cargo on the roof of the motor vehicle. In other non-limiting examples, the roof rack can include one or more motors (not shown) that are attached to the rails for moving the assemblies between the first and second positions.

At block 308, the scotch yoke 114 moves relative to the stanchion 116 from the unclamped state to the clamped state, in response to the crossbar 130 moving to the second position, with the scotch yoke 114 being enclosed between the stanchion 116 and the cover 118. Continuing with the previous example, the body 160 of the scotch yoke 114 of each of the first and second clamp mechanisms 142, 144 angularly moves relative to the stanchion 116 from the second rotational position to the first rotational position, in response to the tool 156 rotating the shaft 152 in the other of the clockwise direction and the counterclockwise direction. The carrier 174 moves relative to the stanchion 116 to the inboard position, in response to the body 160 angularly moving to the first rotational position, with the carrier 174 enclosed between the stanchion 116 and the cover 118.

At block 310, the first and second rail gripping surfaces 146, 150 of the first and second clamp mechanisms 142, 144 grip an associated one of the first and second rails 106, 108 therebetween to hold the crossbar 130 in the second position in response to the scotch yoke 114 of each of the first and second clamp mechanisms 142, 144 moving to the clamped state. The lock mechanism 208 is moved from the unlocked state to the locked state. The lid 204 is inserted into the opening 202 of the cover 118, and the key 206 is engaged to the lid 204 to rotate the lid 204.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A crossmember assembly of an adjustable roof rack for a motor vehicle having a roof, the adjustable roof rack having first and second rails attached to the roof, and each of the first and second rails having one of a range of widths and spaced from one another by one of a range of distances, the crossmember assembly comprising:
    a crossbar having first and second ends along an axis;
    a first clamp mechanism engaged with the first end of the crossbar for securing the crossbar to the first rail; and
    a second clamp mechanism engaged with the second end of the crossbar for securing the crossbar to the second rail;
    wherein each of the first and second clamp mechanisms comprises:
        a stanchion attached to the crossbar and having a first rail gripping surface; and
        a scotch yoke rotatably mounted to the stanchion, with the scotch yoke having a second rail gripping surface and being movable relative to the stanchion to a clamped state where the first and second rail gripping surfaces of the first and second clamp mechanisms grip an associated one of the first and second rails, and the scotch yoke is further movable relative to the stanchion to an unclamped state where the second rail gripping surface of the first and second clamp mechanisms is spaced from an associated one of the first and second rails.

2. The crossmember assembly of claim 1 wherein the scotch yoke comprises:
    a body rotatably mounted to the stanchion and angularly moved between first and second rotational positions relative to the stanchion; and
    a carrier mounted to the stanchion, with the carrier movable relative to the stanchion to an inboard position in response to the body angularly moving to the first rotational position, and the carrier being further movable relative to the stanchion to an outboard position in response to the body angularly moving to the second rotational position;
    wherein the carrier includes the second rail gripping surface, and the first and second rail gripping surfaces of the first and second clamp mechanisms grip an associated one of the first and second rails to secure the crossbar in a fixed position in response to the carrier moving toward the inboard position.

3. The crossmember assembly of claim 2 wherein the second rail gripping surface of the first and second clamp mechanisms is spaced from an associated one of the first and second rails to allow the crossmember assembly to move along the first and second rails in response to the carrier moving toward the outboard position.

4. The crossmember assembly of claim 3 wherein one of the body and the carrier defines an elongated slot and the other of the body, and the carrier is rotatably mounted to a post that is in turn received within the elongated slot, such that the carrier moves between the inboard and outboard positions in response to the body angularly moving between the first and second rotational positions.

5. The crossmember assembly of claim 4 wherein one of the carrier and the stanchion includes at least one elongated pin, and the other of the carrier and the stanchion defines at least one bore, with the at least one elongated pin being movable through the at least one bore in response to the carrier moving between the inboard and outboard positions.

6. The crossmember assembly of claim 5 further comprising a biasing member having a first end attached to the carrier and a second end attached to the stanchion, such that the biasing member urges the carrier toward the inboard position.

7. The crossmember assembly of claim 5 wherein each of the first and second clamp mechanisms further comprises at least one modular pad attached to at least one of the stanchion and the scotch yoke for gripping an associated one of the first and second rails.

8. The crossmember assembly of claim 7 wherein each of the first and second clamp mechanisms further includes a lock mechanism, with the lock mechanism movable to an unlocked state where the carrier is movable between the inboard and outboard positions, and the lock mechanism is further movable to a locked state where the lock mechanism holds the carrier in at least one of the inboard and outboard positions.

9. An adjustable roof rack of a motor vehicle having a roof, the adjustable roof rack comprising:
   first and second rails attached to the roof, with each of the first and second rails having one of a range of widths, and the first and second rails being spaced from one another by one of a range of distances; and
   a crossmember assembly comprising:
      a crossbar having first and second ends along an axis;
      a first clamp mechanism engaged with the first end of the crossbar for securing the crossbar to the first rail; and
      a second clamp mechanism engaged with the second end of the crossbar for securing the crossbar to the second rail;
      wherein each of the first and second clamp mechanisms comprises:
         a stanchion attached to the crossbar and having a first rail gripping surface; and
         a scotch yoke attached to the stanchion and having a second rail gripping surface, with the scotch yoke being movable relative to the stanchion to a clamped state where the first and second rail gripping surfaces of the first and second clamp mechanisms grip an associated one of the first and second rails, and the scotch yoke being further movable relative to the stanchion to an unclamped state where the second rail gripping surface is spaced from an associated one of the first and second rails; and
         a cover attached to the stanchion, with the scotch yoke enclosed between the cover and the stanchion when the scotch yoke is moved between the clamped and unclamped states.

10. The adjustable roof rack of claim 9, wherein each of the first and second rails includes a front end and a rear end, and the cover comprises:
   a forward surface that faces toward the front end of the first and second rails;
   a rearward surface that faces toward the rear end of the first and second rails; and
   an outboard surface that faces away from the crossbar;
   wherein at least one of the forward surface, the rearward surface, and the outboard surface defines an opening, with the opening adapted to receive a tool for operating the scotch yoke to facilitate an associated one of the first and second clamp mechanisms with moving between the clamped and unclamped states, and the opening is selectively closed by a lid engaged to the cover.

11. The adjustable roof rack of claim 10 wherein the scotch yoke comprises:
   a shaft rotatably attached to the stanchion, with the shaft having a first end adapted to be engaged by the tool for rotating the shaft and a second end disposed opposite to the first end;
   a body attached to the second end of the shaft, and the body is angularly movable between first and second rotational positions relative to the stanchion in response to the tool rotating the shaft; and
   a carrier mounted to the stanchion, with the carrier movable to an inboard position in response to the body angularly moving to the first rotational position, and the carrier is further movable to an outboard position in response to the body angularly moving to the second rotational position;
   wherein the carrier includes the second rail gripping surface, and the first and second rail gripping surfaces of the first and second clamp mechanisms grip an associated one of the first and second rails to secure the crossbar in a fixed position in response to the carrier moving toward the inboard position.

12. The adjustable roof rack of claim 11 wherein the second rail gripping surface of the first and second clamp mechanisms is spaced from an associated one of the first and second rails to allow the crossmember assembly to move along the first and second rails in response to the carrier moving toward the outboard position.

13. The adjustable roof rack of claim 12 wherein one of the body and the carrier defines an elongated slot, and the other of the body and the carrier is rotatably mounted to a post that is in turn received within the elongated slot, such that the carrier moves between the inboard and outboard positions in response to the body angularly moving between the first and second rotational positions.

14. The adjustable roof rack of claim 13 further comprising a bushing disposed within the elongated slot for engaging the post.

15. The adjustable roof rack of claim 13 wherein each of the first and second clamp mechanisms further includes a lock mechanism, with the lock mechanism being movable to an unlocked state where the carrier is movable between the inboard and outboard positions, and the lock mechanism is further movable to a locked state where the lock mechanism holds the carrier in at least one of the inboard and outboard positions.

16. The adjustable roof rack of claim 15 wherein the lock mechanism comprises:
   a gear attached to the shaft;
   a pawl mounted to the cover, with the pawl being movable relative to the scotch yoke to a latched position where the pawl engages the gear for holding the shaft in a fixed position, and the pawl is further being relative to the scotch yoke to an unlatched position where the pawl is spaced from the gear to permit the shaft to rotate; and
   a spring attached to the cover and urging the pawl to the latched position.

17. The adjustable roof rack of claim 16 wherein the cover defines an opening positioned adjacent to one of the pawl and the second end of the shaft, with the opening adapted to receive the tool such that the tool engages one of the pawl and the second end of the shaft to facilitate rotation of the shaft when the scotch yoke is enclosed between the cover and the stanchion.

18. A process of operating an adjustable roof rack for a motor vehicle having a roof, the adjustable roof rack having first and second rails attached to the roof, and each of the first and second rails having one of a range of widths and spaced from one another by one of a range of distances, and the adjustable roof rack further having a crossmember assembly that includes a crossbar and first and second clamp mechanisms, with the crossbar having first and second ends along an axis and each of the first and second clamp mechanisms being engaged with an associated one of the first and second ends, each of the first and second clamp mechanisms having a stanchion with a first rail gripping surface, a scotch yoke with a second rail gripping surface, and a cover attached to the stanchion, the process comprising:

moving the scotch yoke relative to the stanchion from a clamped state to an unclamped state when the scotch yoke is enclosed between the stanchion and the cover;

spacing the second rail gripping surface of the first and second clamp mechanisms from an associated one of the first and second rails in response to the scotch yoke being moved to the unclamped state;

moving the crossbar from a first position to a second position along the first and second rails;

moving the scotch yoke relative to the stanchion from the unclamped state to the clamped state in response to the crossbar moving to the second position, with the scotch yoke enclosed between the stanchion and the cover; and gripping, using the first and second rail gripping surfaces of the first and second clamp mechanisms, an associated one the first and second rails to hold the crossbar in the second position in response to the scotch yoke moving to the clamped state.

19. The process of claim 18 further comprising:

angularly moving, using a shaft coupled a body, the body of the scotch yoke from a first rotational position to a second rotational position relative to the stanchion;

moving the carrier to an outboard position in response to the body angularly moving to the second rotational position, with the carrier being enclosed between the stanchion and the cover; and spacing the second rail gripping surface of each of the first and second clamp mechanisms from an associated one of the first and second rails in response to the carrier moving to the outboard position.

20. The process of claim 19 further comprising:

angularly moving, using the shaft, the body of the scotch yoke from the second rotational position to the first rotational position relative to the stanchion;

moving the carrier to an inboard position in response to the body angularly moving to the first rotational position, with the carrier being enclosed between the stanchion and the cover; and gripping an associated one of the first and second rails between the first and second rail gripping surfaces of the first and second clamp mechanisms in response to the carrier moving to the inboard position.

* * * * *